S. PIERCE.

Cook-Stove.

No. { 137, 1,241. }

Reissued Dec. 3, 1861.

Fig. 4. x. x

Fig. 5. z. z.

N. PETERS, PHOTO-LITHOGRAPHER, WASHINGTON, D. C.

UNITED STATES PATENT OFFICE.

SAMUEL PIERCE, OF TROY, NEW YORK, ASSIGNOR TO JOHNSON & COX, OF SAME PLACE, ASSIGNORS, THROUGH MESNE ASSIGNMENTS, TO SAMUEL PIERCE AFORESAID.

IMPROVEMENT IN COOKING-STOVES.

Specification forming part of Letters Patent No. 4,299, dated December 6, 1845; Reissue No. 91, dated April 24, 1847; Reissue No. 99, dated July 31, 1847; extended December 6, 1859; Reissue No. 1,241, dated December 3, 1861.

DIVISION No. 2.

*To all whom it may concern:*

Figure 1:
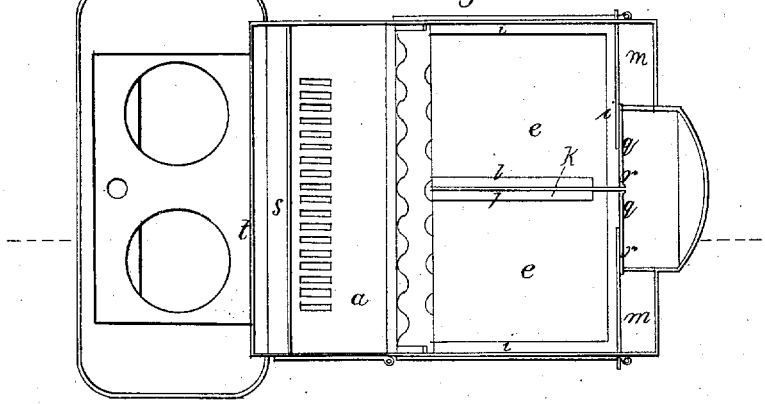
Figure 3:
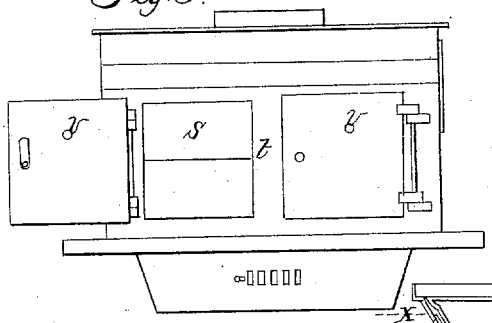
Figure 2:
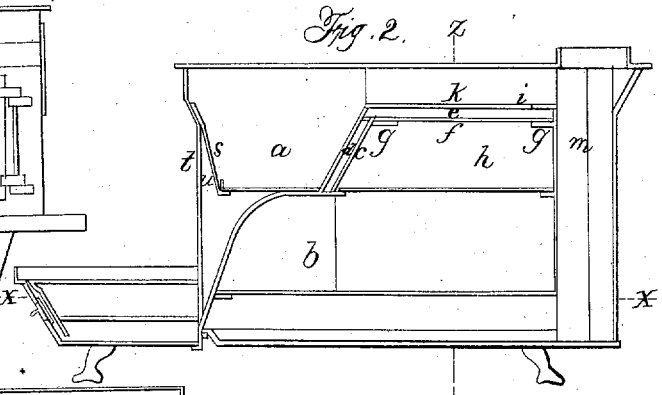
Figure 2:
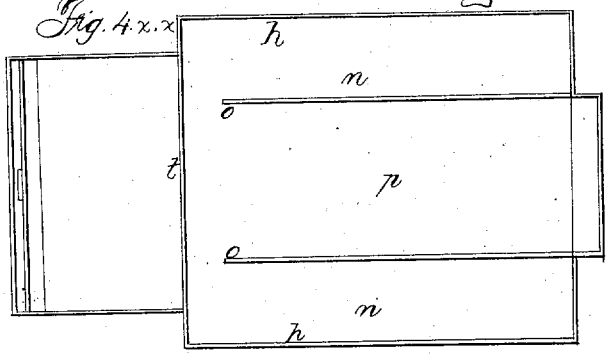
Figure 2:
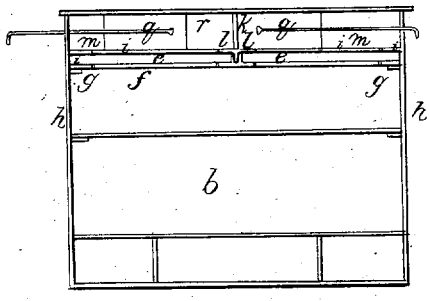

Be it known that I, SAMUEL PIERCE, of the city of Troy, county of Rensselaer, and State of New York, did, on or about the 6th day of December, 1845, obtain of and from the United States of America certain Letters Patent for and upon new and useful Improvements in Cooking-Stoves, and bearing title of "Improvements in Cooking-Stoves," which were duly reissued on the 24th day of April, 1847, and again on the 31st day of July, 1847, and which were duly extended, in conformity to law, on or before the 6th day of December, 1859. I, therefore, do hereby declare that the following is a full and exact description of the said improvements relating to the first and second parts of the said invention set forth in the said last reissue. The other part of the said improvements I have fully described in another specification of even date herewith and in this application for a reissue of the said extended Letters Patent, thereby asking separate patents upon the parts of the said invention, as described in each specification thereof, reference being had to the accompanying drawings and to letters of reference marked thereon, making a part of this specification, in which the improvements herein described are shown at Figures 1, 2, 3, and 5.

The nature of the improvements herein described consists in creating a space between the front of the fire-chamber and the end plate of the stove, which outer plate or door, as the case may be, shall have openings in the form of a damper or otherwise at or near the top thereof, through which and by means of which openings or opening the air is admitted for the purpose of feeding the fire after the said air shall have passed down along the side of the plate of the said fire-chamber and between the same and the said front plate, door or doors, thereby and by means thereof heating the said air before it enters under the said fire-chamber and upward through the said fire-grate into the fire.

It also consists in combining with an oven of any cook-stove a top made of fire-brick or other refractory earthy substance inserted like panels in an iron frame, so that the flame and highly-heated gases and other products of combustion, in passing over the oven or around it from the fire-chamber to the flues in the back and down the same and under the bottom of the oven, shall act on this earthy substance.

In the accompanying drawings, *e e* represent the fire-brick or other earthy substance inserted and secured in the following manner, to wit: An iron frame, *f*, rests on flanges or ledges *g*, which project from the side plates, *h h*, of the stove and from the back and front plate of the oven, and in this frame is placed two slabs or panels of fire-brick, *e e*, and hereinbefore described, which are put in from between the frame and another set of ledges or flanges, *i*, and then a vertical division plate, *k*, is inserted between the two, this being also provided with flanges *l l* to hold down the slabs or panels on the middle rib of the frame. When the front plate is put in, the said slabs or panels are firmly secured in their proper place. The edges thereof must be cemented in order to secure good joints.

In the front of the fire-chamber *a* there is a plate, *s*, which falls back somewhat from the front plate, *t*, so as to aid in part in the forming of the air-space *u*. The said front plate, *t*, may be somewhat curved outward, so as to create a larger space between the same and the said plate *s*, if thought best. If doors are used instead of the plate *t* (being an equivalent for the same) they may also curve outward for the same purpose as curving outwardthe said plate *t*. This space thus created is for the passage of the air which enters through the opening *v*, at or near the top of the said plate *t*, or doors, as the case may be. The air, on its passage from these openings down the said space *u*, becomes highly heated by the radiation of heat through the plate *s* of the said fire-chamber. The air being thus admitted and its direction thus given, it prevents the rapid destruction of the said plate *s* by not allowing it to become too highly heated. It also prevents the front of the oven from becoming

BEST AVAILABLE COPY cool, as in ordinary stoves, because the air surrounding this part of the oven is heated before it comes in contact therewith, which facilitates baking operations, and keeps the fire and oven in good condition by not becoming suddenly cooled by the admission of cold air thereto.

By the construction of an oven in the manner as herein described, of and by means of fire-brick top, or other earthy substance, inserted like panels in an iron frame, so that the flame and highly-heated gases and other products of combustion, in passing directly over the oven from the fire to the diving-flues in the back, shall act on this earthy substance instead of on iron, as heretofore. The heat being much greater in the flues at the top in stoves of this construction than in the diving-flues at the back and the flues at the bottom, the interposition of fire-brick or other earthy substance of slight conducting property reduces the heat conducted through the top to about an equality with that given out through the back and bottom, and thus equalizes the temperature to bake equally; but this mode of construction at the same time effects the other important end referred to—it permits the escape, in the most efficient manner, of the gases evolved from the articles under treatment, and thereby greatly improves their flavors. Fire-brick and other earthy substances are known to be porous and to have the quality of absorbing moisture and of giving it out under the action of heat. As the vapors are given out, they, of course, from their rarefied condition, rise to the top and will there be absorbed by the fire-brick top, which, being more highly heated on the upper than on the under surface by reason of the passage of the flame directly over and in contact with it, will give out at the upper surface what is absorbed below, the moisture being conducted through the pores by exhaustion and evaporation, these operations being aided by a well-known physical law—viz., that the passage of a current of air over the opening of a tube, by exhaustion, has the effect to exhaust, so that as the heated current produced by the draft passes over the small apertures or pores of the fire-brick, these are exhausted, which facilitates the passage through them of the vapors absorbed by the under surface.

Having thus described these original improvements in "cooking-stoves," what I claim as my original improvements is—

1. The arrangement of the parts by which the fire is supplied with heated air by its passage through the apertures in the front plate or doors and against the said plate *s*, in front and down the front surface of which it must pass on its passage to the under part of the said fire-chamber and through the fire-grate *a'* into the fire, substantially as and for the purposes herein described and set forth.

2. The making of the top of ovens of cooking-stoves of fire-brick or other earthy substance when this is combined with a stove in which the products of combustion from the fire-chamber pass first over the top of the oven, substantially as described, whereby the heat in the oven is equalized and the vapors or gases evolved in the oven are absorbed and carried off, as described.

In testimony whereof I have on this 4th day of September, 1861, hereunto set my hand.

SAMUEL PIERCE.

Witnesses:
FRANK SCOTT,
MARCUS P. NORTON.